United States Patent
Wallis et al.

(10) Patent No.: US 9,729,199 B2
(45) Date of Patent: Aug. 8, 2017

(54) METHOD FOR PROCESSING AN ANALOG SIGNAL COMING FROM A TRANSMISSION CHANNEL, IN PARTICULAR A SIGNAL CARRIED BY POWER LINE COMMUNICATIONS

(71) Applicant: STMICROELECTRONICS (ROUSSET) SAS, Rousset (FR)

(72) Inventors: Mark Wallis, Mouans Sartoux (FR); Yoann Bouvet, Opio (FR); Pierre Demaj, Nice (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 0 days.

(21) Appl. No.: 14/984,966

(22) Filed: Dec. 30, 2015

(65) Prior Publication Data
US 2016/0285509 A1    Sep. 29, 2016

(30) Foreign Application Priority Data
Mar. 27, 2015 (FR) ...................... 15 52588

(51) Int. Cl.
*H04B 3/54* (2006.01)
*H04L 27/26* (2006.01)
(Continued)

(52) U.S. Cl.
CPC ............. *H04B 3/54* (2013.01); *H04L 5/0007* (2013.01); *H04L 27/2607* (2013.01);
(Continued)

(58) Field of Classification Search
CPC .... H04B 3/54; H04L 27/2656; H04L 27/2675
(Continued)

(56) References Cited

U.S. PATENT DOCUMENTS 5,673,210 A * 9/1997 Etter .................. G11B 20/1876
                                                     702/69
6,314,131 B1   11/2001 Roe et al.
(Continued)

FOREIGN PATENT DOCUMENTS

| JP | 2007258897 | 10/2007 |
| JP | 2009089146 | 4/2009 |
| WO | 2014037066 | 3/2014 |

OTHER PUBLICATIONS

Donlan, "Ultra-wideband Narrowband Interference Cancellation and Channel Modeling for Communications," Blacksburg, Virginia, Jan. 31, 2005, pp. 1-113.

(Continued)

*Primary Examiner* — Michael Neff
(74) *Attorney, Agent, or Firm* — Slater Matsil, LLP

(57) ABSTRACT

A method is for processing an analog signal coming from a transmission channel. The analog signal may include a useful signal modulated on a sub-set of carriers. The method may include analog-to-digital converting of the analog signal into a digital signal, and synchronization processing the digital signal. The synchronizing may include determining, in a time domain, a limited number of coefficients of a predictive filter from an autoregressive model of the digital signal, and filtering the digital signal in the time domain by a digital finite impulse response filter with coefficients based upon the limited number of coefficients to provide a filtered digital signal. The method may include detecting of an indication allowing a location in the frame structure to be identified, using the filtered digital signal and a reference signal.

33 Claims, 5 Drawing Sheets

(51) Int. Cl.
*H04L 5/00* (2006.01)
*H04L 25/03* (2006.01)
*H04L 25/06* (2006.01)

(52) U.S. Cl.
CPC ...... *H04L 27/2656* (2013.01); *H04L 27/2691* (2013.01); *H04L 25/03993* (2013.01); *H04L 25/067* (2013.01); *H04L 27/2675* (2013.01)

(58) Field of Classification Search
USPC ........................................................ 375/257
See application file for complete search history.

(56) References Cited

U.S. PATENT DOCUMENTS

| | | | |
|---|---|---|---|
| 6,594,098 B1 * | 7/2003 | Sutardja | G11B 20/10009 360/46 |
| 6,924,763 B2 | 8/2005 | Poullin | |
| 2003/0011491 A1 * | 1/2003 | Winkler | G08C 15/00 340/870.07 |
| 2003/0063596 A1 | 4/2003 | Arslan et al. | |
| 2006/0087464 A1 * | 4/2006 | Moriya | G10L 19/04 341/144 |
| 2006/0262687 A1 * | 11/2006 | Minemura | G11B 7/00458 369/53.11 |
| 2010/0067629 A1 | 3/2010 | Gaddam et al. | |
| 2010/0124289 A1 | 5/2010 | Yonge, III et al. | |
| 2012/0143553 A1 | 6/2012 | Feistel et al. | |
| 2012/0195384 A1 | 8/2012 | Sato | |
| 2013/0051482 A1 | 2/2013 | Nassar et al. | |
| 2013/0170539 A1 | 7/2013 | Huang et al. | |
| 2014/0064348 A1 | 3/2014 | Braz et al. | |
| 2014/0355621 A1 | 12/2014 | Katar et al. | |
| 2015/0280888 A1 | 10/2015 | Karsi et al. | |

OTHER PUBLICATIONS

Demaj et al, U.S. Appl. No. 15/053,264, filed Feb. 25, 2016.
Demaj et al, U.S. Appl. No. 15/042,326, filed Feb. 12, 2016.
Bouvet et al, U.S. Appl. No. 15/042,429, filed Feb. 12, 2016.
Demaj et al, U.S. Appl. No. 15/042,509, filed Feb. 12, 2016.
Bogdanovic et al., "Improved least square channel estimation algorithm for OFDM based communication over power lines", The Mediterranean Journal of Computers and Networks, Jul. 2014, pp. 232-238.
Tunc, "LPTV-Aware Bit Loading and Channel Estimation in Broadband PLC for Smart Grid", May 2014, pp. 1-97.

* cited by examiner

METHOD FOR PROCESSING AN ANALOG SIGNAL COMING FROM A TRANSMISSION CHANNEL, IN PARTICULAR A SIGNAL CARRIED BY POWER LINE COMMUNICATIONS

RELATED APPLICATION

This application is based upon prior filed copending French Application No. 1552588 filed Mar. 27, 2015, the entire subject matter of which is incorporated herein by reference in its entirety.

TECHNICAL FIELD

The present disclosure is directed to transmission of information over a communications channel and, in particular, to a transmission over an electrical power line.

BACKGROUND

Power line communications technology aims to transmit digital data by exploiting the existing infrastructure of the electrical power grid. It notably allows the remote reading of electrical meters, the exchanges between electric vehicles, and the recharging terminals or else the management and the control power grids (smart grid). Power line communications (PLC) technology notably incorporates communication by narrow-band power line communications (or N-PLC) which is generally defined as a communication over an electrical power line operating at transmission frequencies up to 500 KHz.

N-PLC communication thus generally uses the bands of frequencies notably defined by the European electrotechnical standards committee (Comité Européen de Normalisation ELECtrotechnique-CENELEC) or by the Federal Communications Commission (FCC). Thus, if the CENELEC A band of frequencies (3-95 kHz) is considered, the transmission frequencies are situated between 42 and 89 KHz in the PRIME standard whereas they are situated between 35 and 91 KHz for the PLC-G3 standard.

In these frequency bands, the electrical cables carrying the signals by power line communications are in a very difficult environment. They are notably subjected to interference of the white noise, colored noise, or pulse noise type. Furthermore, they are not protected against any interference. For this reason, any FM/AM radio signal or any wireless communication can lead to the presence of harmonics of these signals within the useful frequency band used by narrow-band PLC communications.

Furthermore, the properties and characteristics of electrical power grids are not known a priori and are variable over time. Thus, interference may be created on an electrical power line when a user connects any given device such as for example a hair dryer or a washing machine. This then results in a propagation of intense frequency harmonics which may also be situated within the useful band of the PLC communications.

Accordingly, such noise signals, which are generally narrow-band noise signals (i.e. Narrow Band Interferer), in other words having a smaller frequency band than the frequency band of the useful signal, interfere with the synchronization phase of the receiver connected to the electrical power line, during which the receiver must be able to be synchronized in order to notably locate the start of the useful data of the frame of symbols carried by the useful signal. The thesis by Brian Michael Donlan titled "Ultra-wideband Narrowband Interference Cancellation and Channel Modeling for Communications", 31 Jan. 2005, Blacksburg, Va., discloses various techniques for eliminating narrow-band noise signals from an ultra-wide-band (UWB) signal, in particular, in the context of spectrum spreading (Spread Spectrum). Some of the approaches disclosed in this document use predictive filters so as to estimate the noise signal before subtracting it from the received signal.

The signals mentioned in this document exhibit characteristics that are very different from the signals used in the communications using power line communications. Indeed, UWB signals (and, in particular, those using direct sequence spread spectrum) exhibit a spreading of the power of the transmitted signal over a wide band of frequencies in order to bury this power in the ambient noise or within the other communications. Thus, the power spectral density (or PSD) of a UWB signal is generally defined as being less than −41 dBm/MHz.

The signals used in PLC communications are signals modulated according to a multi-carrier modulation, for example, a modulation in quadrature on orthogonal carriers (i.e. an Orthogonal Frequency Division Multiplexing (OFDM) modulation), but using only a sub-set of carriers from amongst a larger set of available carriers. Thus, for example, if the CENELEC A band of frequencies is considered, the size of the inverse Fourier transform and of the direct Fourier transform is equal to 512, whereas only 97 sub-carriers (the sub-carriers 86 to 182) are used for the transmission in the PRIME standard. If the CENELEC A band of frequencies is considered, the size of the inverse Fourier transform and of the direct Fourier transform is equal to 256 whereas only 36 sub-carriers (the sub-carriers 23 to 58) are used in the PLC-G3 standard. Furthermore, it may be useful, during the synchronization phase, not to miss any symbol coming from the channel even when the latter is affected by noise.

SUMMARY

Generally speaking, a method is for processing an analog signal coming from a transmission channel. The analog signal may include a useful signal modulated on a sub-set of carriers from a plurality of available carriers. The useful signal carries at least one frame of symbols according to a frame structure, the useful signal to be affected by noise from at least one noise signal in a narrow band. The method may include analog-to-digital converting of the analog signal into a digital signal, and synchronization processing the digital signal. The synchronizing may include determining, in a time domain, a limited number of coefficients of a predictive filter from an autoregressive model of the digital signal, and filtering the digital signal in the time domain by a digital finite impulse response filter with coefficients based upon the limited number of coefficients to provide a filtered digital signal. The method may include detecting of at least one indication allowing at least one location in the frame structure to be identified, using the filtered digital signal and a reference signal.

DETAILED DESCRIPTION

Figure 1:
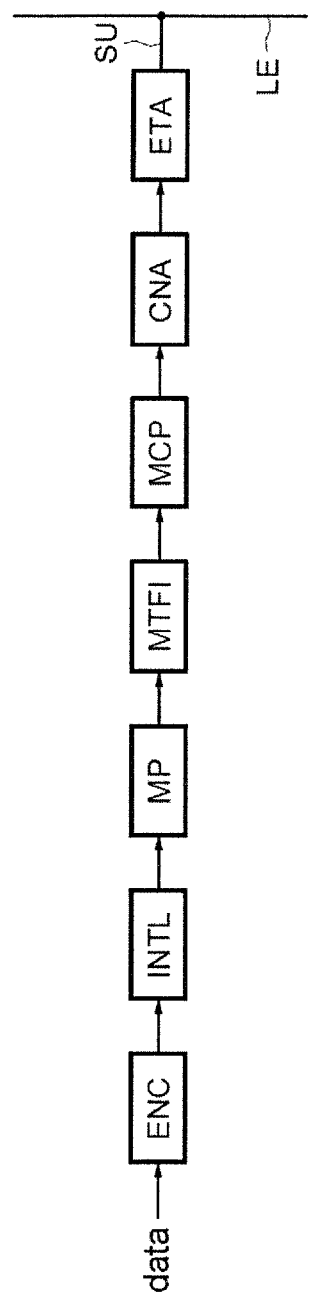
FIG. 1 is a schematic diagram of a transmitter, according to the present disclosure.

Various embodiments of the present disclosure and their implementation are compatible with the various standards governing communication by power line communications, notably but not exclusively the standards PLC-G3, PoweR-line Intelligent Metering Evolution (PRIME) or else the standard IEEE 1901-2. According to one embodiment and its implementation, a processing of an analog signal coming from the transmission channel is provided which allows the performance characteristics of the synchronization phase to be improved whether the analog useful signal is affected by noise or not from at least one narrow-band noise signal. According to another embodiment and its implementation, the aim is also to improve the performance characteristics of the decoding of the remaining part of the frame after synchronization.

According to one embodiment and its implementation, in order to facilitate the synchronization of the receiver, notably when the useful signal is affected by noise from at least one narrow-band noise signal, coefficients of a predictive filter are determined on the fly in the time domain from an autoregressive model of the signal and the signal in the time domain is filtered on the fly by a digital finite impulse response (or FIR) filter whose coefficients are those of the predictive filter.

This therefore differs from the filtering methods of the prior art in which the noise signal is estimated prior to subtracting it from the signal coming from the channel, which requires a perfect synchronization, both in time and in phase, and which is difficult to achieve in practice, notably in the case of a phase synchronization where it is important, on the one hand, not to lose any symbol and, on the other hand, not to introduce phase errors.

According to this embodiment and its implementation, instead of estimating then of subtracting the estimated noise signal, the overall signal coming from the channel is filtered, whether this signal contains or does not contain the noise signal, which allows a non-coherent processing to be carried out, in other words not requiring a perfect synchronization in time and in phase between the moment when the noise signal is estimated and the moment when this noise signal is subtracted from the global signal. The receiver will thus be able to be synchronized using the filtered signal and a reference signal, for example a known symbol.

According to one aspect, a method is therefore provided for processing a channel analog signal coming from a transmission channel, for example an electrical power line. The channel analog signal is able to comprise a useful signal modulated on a sub-set from a set of available carriers, such as for example the useful signals conforming to the PRIME or G3-PLC standards. This useful signal carries at least one frame of symbols according to a frame structure and this useful signal could be affected by noise from at least one narrow-band noise signal.

In general, the noise signal is a noise peak at a single frequency contained within the band of frequencies of the useful signal but, more generally, a narrow-band noise signal is a noise signal whose band of frequencies is smaller than the band of frequencies of the useful signal. Thus, the channel analog signal may perfectly well, at a given moment in time, not comprise any useful signal or else only comprise at least one noise signal, or else a noise-free useful signal or a useful signal affected by noise.

The method according to this aspect then comprises an analog-digital conversion of the channel analog signal and a synchronization processing comprising a filtering processing. The channel analog signal that will undergo the analog/digital conversion may for example be the analog signal coming directly from the channel or else, as is generally the case, the analog signal delivered by an analog input stage (notably comprising band pass filters, low-pass filters and an amplifier) connected to the transmission channel.

The filtering processing includes a determination on the fly in the time domain of a limited number of coefficients of a predictive filter from an autoregressive model of a channel digital signal coming from the analog/digital conversion and a filtering on the fly of the channel digital signal in the time domain by a digital finite impulse response filter whose coefficients are those of the predictive filter. The channel digital signal on which the filtering processing is carried out is not necessarily the digital signal coming directly from the analog/digital conversion but may for example be the digital signal coming from the analog/digital conversion and which could have been subjected to an under-sampling.

The signals modulated on a sub-set of carriers from amongst a set of available carriers have totally different characteristics from the UWB signals or with spread frequency spectrum. They do indeed notably exhibit a level of power much higher than that of a UWB signal or signal with spread frequency spectrum and it is then preferable to take precautions in the filtering so as to avoid completely filtering the useful signal in the absence of narrow-band noise.

Indeed, in view notably of the fact that only a few carriers are used for the modulation from amongst the available set of carriers (size of the inverse or direct Fourier transform), the number of coefficients of the filter should preferably be limited so as to avoid having too high of an attenuation of the useful signal in the absence of a noise signal.

In other words, the number of coefficients of the filter is advantageously less than or equal to a limiting number which is chosen so as to form a finite impulse response filter whose frequency response comprises, in the presence of the noise signal, a notch at the frequency band of the noise signal, and whose frequency response, in the absence of a noise signal, has a relatively flat profile in the band of frequencies of the useful signal in such a manner as to allow an attenuation of the useful signal less than a chosen value, for example 6 dB, which does of course depend on the application envisioned.

The number of coefficients will furthermore preferably be equal to this limiting number so as to more easily take into account potentially several narrow-band noise signals with different tones. Those skilled in the art will be able to adapt the limiting number of coefficients according to the application envisioned and the desired characteristics for the maximum acceptable attenuation of the useful signal in the absence of a noise signal. However, the inventors have observed that, when each symbol comprises a cyclical prefix, the acceptable limiting number for coefficients of the filter is around three quarters, and preferably around half of the length of the cyclical prefix expressed in number of samples.

It is recalled here that the cyclical prefix mainly allows the inter-symbol interferences to be eliminated and is a technique which consists in copying one part of a symbol to place it upstream of this symbol. In practice, the poles of the predictive filter coming from the autoregressive model of the signal become the zeros of the finite impulse response filter. Accordingly, the FIR filter can only attenuate the frequencies corresponding to these zeros.

So, in such a manner as to further limit the attenuation of the useful signal during the filtering, it is advantageous for the coefficients of the predictive filter to be calculated at a processing frequency in the range between 2 and 5 times, and preferably between 2 and 3 times, the maximum frequency of the channel digital signal. This allows the useful signal to then be considered for the filter as a kind of white noise with respect to the noise signal, which would not be the case if the processing frequency were much higher than the maximum frequency of the channel digital signal.

The determination of the coefficients of the filter and the filtering itself are carried out in the time domain and on the fly, in other words progressively with the arrival of the channel analog signal. This avoids any symbol being missed whether the signal is affected by noise or not. The method according to this aspect also comprises a detection of at least one indication allowing at least one location in the frame structure to be identified, using the filtered channel digital signal and a reference signal. The indication may for example be the recognition of a known symbol from the preamble sequence of a frame and the reference signal may be this known symbol, the detection then being applied for example by moving correlation operations.

According to one embodiment, the determination on the fly of the coefficients and the filtering on the fly comprise an organization of the samples of the digital signal into successive groups of samples, a determination of a current block of coefficients using the current group of samples, and an application to the current group of the finite impulse response filter having the current block of coefficients in such a manner as to obtain a filtered current group of samples.

According to one embodiment, each frame comprises a preamble sequence comprising known symbols and preceding the remaining part of the frame, and the filtering processing is applied at least for detecting the at least one indication within the preamble sequence of at least one frame. When the transmission is totally asynchronous, in other words the receiver does not know the time period between successive frames, it is advantageous for the filtering processing operations to be applied at least for detecting the indication on the preamble sequence of each frame.

For the filtered digital signal, it cannot be known whether this filtered signal results from a useful signal affected by noise or from a noise-free useful signal. It is accordingly advantageous, after the detection of the indication, to carry out a verification of the presence or of the absence of the noise signal, for example based on at least one known symbol of the unfiltered useful signal. Indeed, this will allow the processing of the further symbols of the frame to be improved.

This verification may comprise a direct Fourier transform processing on the unfiltered known symbol and an analysis of the power of each carrier. This verification is for example carried out on a symbol of the preamble sequence. Then, in the case of absence of the noise signal, the processing of the remaining part of the frame is advantageously carried out on the unfiltered channel digital signal, which enables the decoding of the symbols of the remaining part of the frame to be carried out on an unfiltered, in other words unattenuated, signal. On the other hand, in the presence of the noise signal, the processing of the remaining part of the frame will be carried out on the filtered channel digital signal.

This processing of the remaining part comprises a direct Fourier transform processing, a de-mapping processing supplying for each carrier a value of the modulation coefficient (each symbol comprises modulation coefficients, or "bins", respectively associated with the carriers) and a determination, for each modulation coefficient, of a confidence indicator (soft decision) for the value. It is then advantageous to force to zero the confidence indicators of the modulation coefficients associated with the carriers whose frequencies correspond to those of the noise signal. This allows the performance characteristics of the decoding to be improved notably when a de-interlacer-decoder pair of the Viterbi type (or any other decoder based on soft decisions) is used. It is also preferable, in order not to interfere too much with the decoding, to freeze the values of the coefficients of the filter during the processing of the remaining part of the frame.

According to another aspect, a receiver is provided, comprising an input stage designed to be connected to a transmission channel and configured for delivering a channel analog signal coming from the transmission channel, the channel analog signal being able to comprise a useful signal modulated on a sub-set from a set of available carriers, carrying at least one frame of symbols according to a frame structure and which could be affected by noise from at least one narrow-band noise signal, an analog/digital conversion stage for performing an analog/digital conversion of the channel analog signal, and a processing stage comprising filtering means or a filter including a calculation module configured for determining, on the fly, a limited number of coefficients for a predictive filter from an autoregressive model of a channel digital signal coming from the analog/digital conversion stage, a digital finite impulse response filter, whose coefficients are those of the predictive filter, for performing a filtering on the fly of the channel digital signal in the time domain and detection means or a detector configured for detecting at least one indication allowing at least one location in the frame structure to be identified, using the filtered digital signal and a reference signal.

According to one embodiment, each symbol comprises a cyclical prefix and the number of coefficients of the filter is less than or equal to a limited number which is of the order of three quarters, preferably of the order of a half, of the length of the cyclical prefix expressed in number of samples. According to one embodiment, the calculation module is configured for calculating the coefficients of the predictive filter at a processing frequency in the range between 2 and 5 times, preferably between 2 and 3 times, the maximum frequency of the channel digital signal.

According to one embodiment, the processing stage comprises organizing means or an organizer circuit configured for regrouping the samples of the channel digital signal into successive groups of samples, the calculation module is configured for determining a current block of coefficients using the current group of samples, and the digital filter is configured for receiving the current group of samples at the input so as to deliver a filtered current group of samples.

According to one embodiment, each frame comprises a preamble sequence comprising known symbols and preceding the remaining part of the frame, and the processing stage comprises control means or a controller configured for delivering the channel digital signal to the filtering means at least so that the detection means detect the at least one indication within the preamble sequence of at least one frame. According to one embodiment, the control means are configured for delivering the channel digital signal to the filtering means at least so that the detection means detect the at least one indication within the preamble sequence of each frame.

According to one embodiment, the receiver furthermore comprises verification means or a verification circuit configured for carrying out, after the detection of the at least one indication, a verification of the presence or of the absence of the noise signal based on at least one symbol of the unfiltered useful signal. According to one embodiment, the verification means comprise a direct Fourier transform stage configured for performing a direct Fourier transform processing on the at least one symbol and means of analysis configured for carrying out an analysis of the power of each carrier.

According to one embodiment, the verification means are configured for carrying out the verification on at least one symbol from the preamble sequence. According to one embodiment, the processing stage furthermore comprises additional processing means or an additional processor configured for carrying out a processing of the remaining part of each frame and in the case of the absence of the noise signal, the control means are configured for delivering the remaining part of the frame directly to the additional processing means without going through the filtering means.

According to one embodiment, each symbol comprising modulation coefficients respectively associated with the carriers, the additional processing means comprise a direct Fourier transform stage, a de-mapping means or a de-mapper supplying for each carrier a value of the modulation coefficient and a module able to determine a confidence indicator of the value for each modulation coefficient, and forcing means or zeroing circuit configured for, in the case of presence of the noise signal, forcing to zero the confidence indicators for the modulation coefficients associated with the carriers whose frequencies correspond to those of the noise signal.

According to one embodiment, the control means are configured for disabling the module for calculating the coefficients of the filter during the processing of the remaining part of the frame (freezing of the coefficients of the filter). According to one embodiment, the useful signal is a signal modulated according to an OFDM modulation. Furthermore, the transmission channel can be an electrical power line, the useful signal then being a signal carried by power line communications.

According to yet another aspect, independently of an application to a synchronization, a method is provided for filtering a channel analog signal coming from a transmission channel, the channel analog signal being able to comprise a useful signal, for example modulated on a sub-set from a set of available carriers, and which could be affected by noise from at least one narrow-band noise signal, the method comprising an analog/digital conversion of the channel analog signal and a filtering processing including a determination on the fly in the time domain of coefficients of a predictive filter from an autoregressive model of a channel digital signal coming from the analog/digital conversion and a filtering on the fly of the channel digital signal in the time domain by a digital finite impulse response filter whose coefficients are those of the predictive filter. The number of coefficients is advantageously limited as indicated hereinbefore and/or the coefficients of the predictive filter are calculated at a processing frequency in the range between 2 and 5 times, preferably between 2 and 3 times, the maximum frequency of the channel digital signal. According to yet another aspect, a receiver is provided designed to be connected to the transmission channel and comprising means or circuitry, such as those defined hereinbefore, configured for implementing such a filtering method.

The embodiments and their implementation will now be described within the framework of a transmission of information via power line communications (PLC), although the present disclosure is not limited to this type of application. In the following part of the description, each time that the standards PLC-G3 or PRIME are mentioned by way of non-limiting examples, it will be assumed that the CENELEC A band of frequencies (3-95 kHz) are being considered.

Reference is now made to FIG. 1, a transmitter is capable of transmitting a useful signal SU over an electrical power line LE by power line communications. The transmission chain comprises, for example, an encoder ENC (e.g. a convolution-type encoder) receiving the data to be transmitted from source coding means or a source code store. Interlacing means or a interlacing circuit INTL are connected to the output of the encoder and are followed by "mapping" means or a mapper which transform the bits into symbols according to a transformation scheme depending on the type of modulation used, for example a modulation of the BPSK type or, more generally, a QAM modulation. Each symbol contains modulation coefficients associated with carriers which will be modulated accordingly. The symbols are delivered at the input of processing means or a processor MTFI designed to perform an inverse fast Fourier transform (IFFT) operation.

Figure 2:
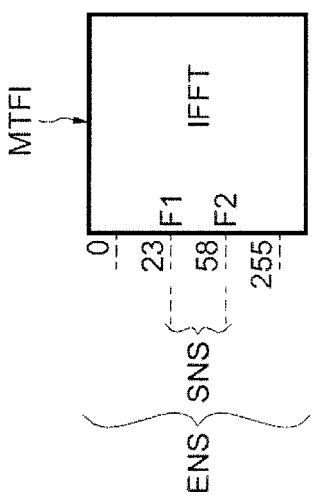
FIG. 2 is a schematic diagram of modulated carriers form a sub-set SNS of carriers, according to the present disclosure.

Referring now to FIG. 2, it will be noted that the modulated carriers form a sub-set SNS of carriers from amongst a set ENS of available carriers (a set which corresponds to the size of the inverse Fourier transform). Thus, in the PLC-G3 standard, the size of the inverse Fourier transform is equal to 256, whereas the modulated carriers of the sub-set SNS are included between the ranks 23 and 58, which corresponds to a frequency band F1-F2 in the range between 35 and 91 KHz. The sampling frequency here is equal to 400 KHz leading to a separation between the carriers equal to 1.5625 KHz, which thus renders the frequencies orthogonal (i.e. the OFDM modulation).

In the PRIME standard, the size of the inverse Fourier transform is equal to 512, whereas the number of carriers of the sub-set SNS is equal to 97, which provides a frequency band extending between 42 and 89 KHz for the useful signal. The modulation coefficients associated with the unused carriers are equal to 0.

The OFDM signal in the time domain is generated at the output of the processing means MTFI, and means or an adder circuit MCP add to each OFDM symbol in the time domain, a cyclical prefix which is a copy, in the header of the OFDM symbol, of a certain number of samples situated at the end of this symbol. By way of example, in the PLC-G3 standard, the length of the cyclical prefix is 30 samples for a sampling frequency of 400 KHz, whereas it is 48 samples for a sampling frequency of 250 KHz in the PRIME standard. The signal is subsequently converted in a digital/analog converter CNA then processed in a stage ETA, commonly denoted by those skilled in the art using the term "Analog Front End", where it notably undergoes a power amplification, prior to being transmitted over the electrical power line LE.

Figure 3:
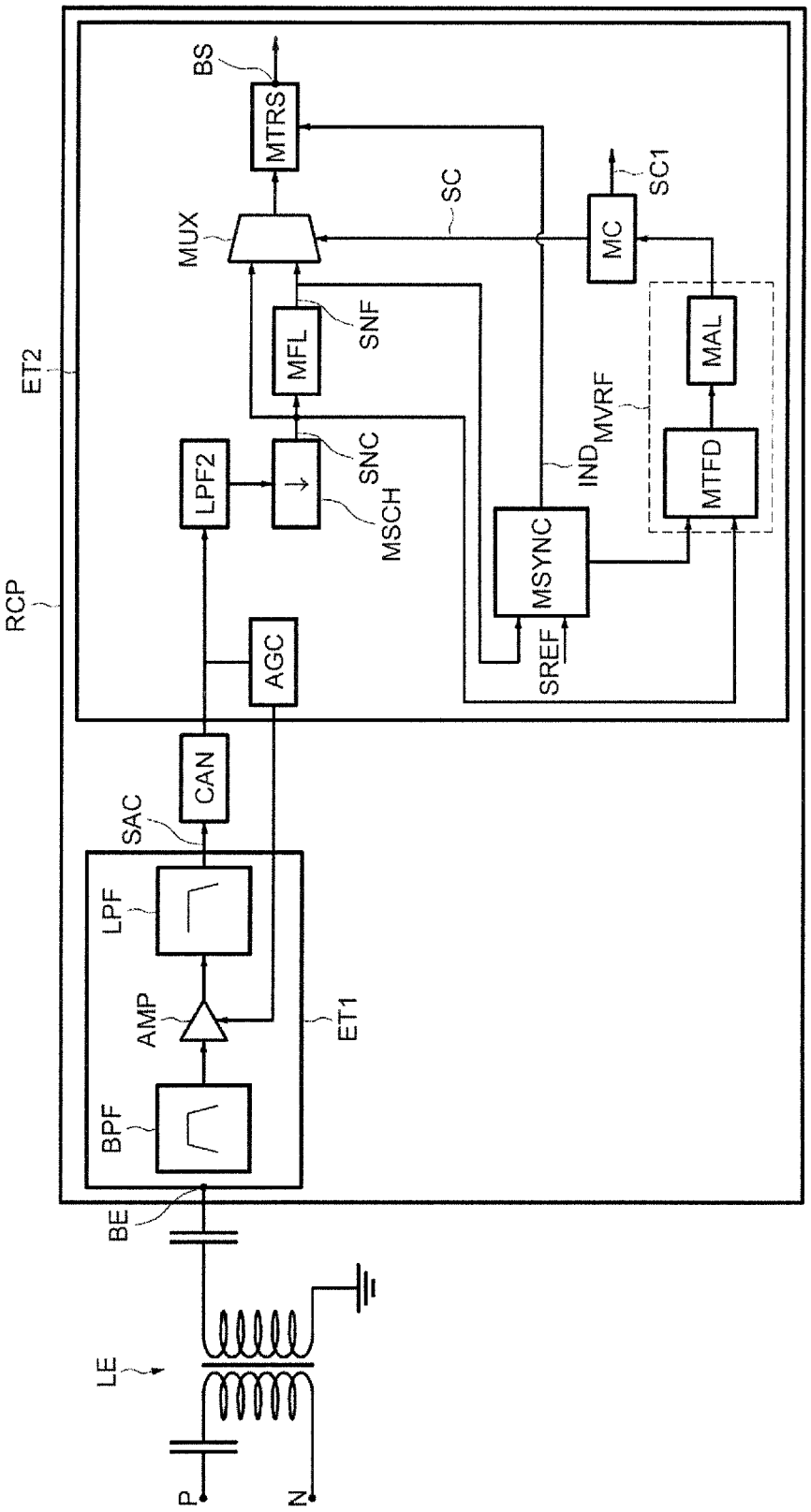
FIG. 3 is a schematic diagram of a receiver, according to the present disclosure.

In reception, referring now to FIG. 3, it can be seen that the receiver RCP here comprises an analog input stage ET1 whose input terminal BE is connected to the electrical power line LE. The analog input stage ET1 typically comprises a band pass filter BPF, a low-pass filter LPF, and means of amplification or an amplifier AMP. The output of the stage ET1 is connected to an analog/digital conversion stage CAN whose output is connected to the input of a processing stage ET2. The processing stage ET2 here comprises automatic gain control means or an automatic gain control circuit AGC allowing the value of the gain of the amplification means AMP of the stage ET1 to be controlled.

Figure 4:
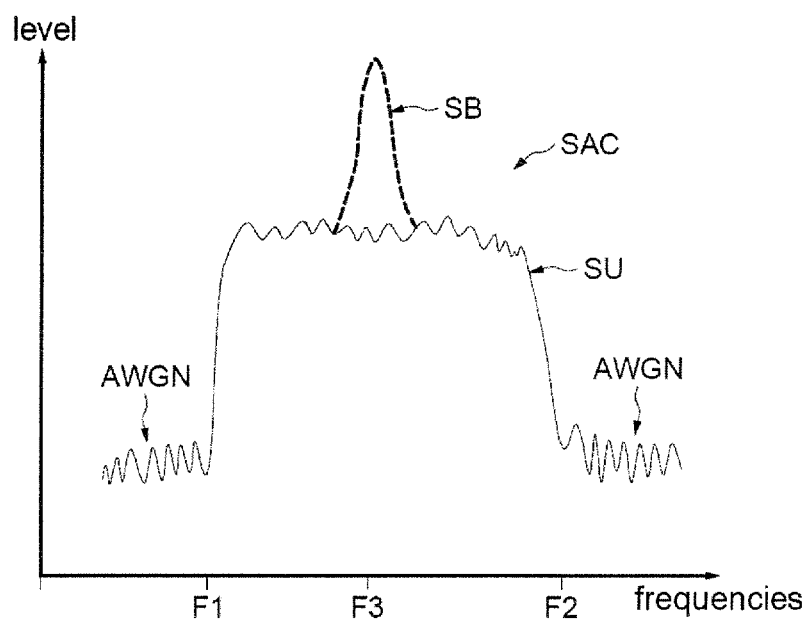
FIG. 4 is a diagram of a frequency spectrum, according to the present disclosure.

The signal SAC delivered at the output of the analog stage ET1 and at the input of the analog/digital conversion stage CAN denotes a channel analog signal (i.e. an analog signal) coming from the transmission channel (electrical power line) LE. By way of non-limiting example, the frequency spectrum of such a channel analog signal SAC is illustrated schematically in FIG. 4.

It can be seen that this signal SAC comprises the useful signal SU carrying the data transmitted from the transmitter and whose band of frequencies is situated between the frequencies F1 and F2 corresponding to the numbers of the modulated carriers. The signal SAC also potentially comprises a narrow-band noise signal SB, which will potentially interfere with the useful signal SU.

Generally, the noise signal SB comprises a single tone situated at the frequency F3. It may however in practice be distributed over the carrier with a frequency F3 and also over a few adjacent carriers. It can be seen that the signal SU is a signal in the shape of a dome whose level is much higher than the level of AWGN noise of the channel in the absence of a signal. The level of the noise signal SB is on the other hand higher than the level of the useful signal SU.

Referring now back to FIG. 3, it can be seen that the processing stage ET2 also comprises a low-pass filter LPF2 followed, although this is not indispensible, by under-sampling means or an under-sampler MSCH. The sampling frequency of the signal upstream of the means MSCH is denoted Fs, whereas the sampling frequency of the signal at the output of the means MSCH is denoted Fss.

The signal SNC at the output of the means MSCH then denotes here a channel digital signal which is coming from the analog/digital conversion of the channel analog signal SAC and to which a filtering processing in filtering means or a filter MSL will notably be applied as will be seen in more detail hereinafter.

In the following part, the frequency Fc denotes the processing frequency at which will notably be calculated the coefficient of the filter of the filtering means MFL. In the G3-PLC standard, for example, the sampling frequency Fs specified is 400 KHz for a size of FFT of 256.

Although it would have been possible to carry out all the filtering operations at a processing frequency Fc equal to the sampling frequency Fs of 400 KHz, under-sampling the signal at a frequency Fss less than Fs, and carrying out all the filtering operations at the processing frequency Fc equal to Fss allows the complexity of implementation of the processing stage, and notably of the filtering means, to be reduced and also allows a direct fast Fourier transform (FFT) processing to be carried out with a reduced size with respect to the specified size of 256.

Figure 5:
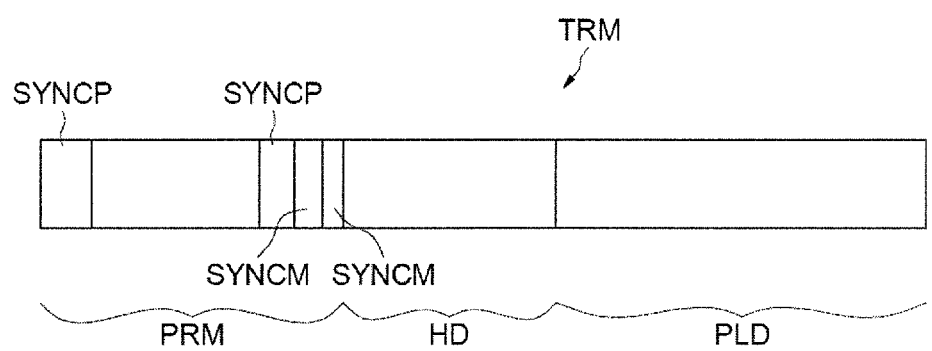
FIG. 5 is a schematic diagram of a frame of data, according to the present disclosure.

Before returning in more detail to the structure of the filtering means MFL and to the other means that are incorporated into the processing stage ET2, reference is now made to FIG. 5 in order to illustrate the structure of a frame carrying symbols, for example in the framework of the PLC-G3 standard. The frame TRM comprises a preamble sequence PRM here comprising eight known symbols SYNCP followed by a symbol of opposing phase SYNCM itself followed by a semi-symbol SYNCM.

The frame TRM subsequently comprises a header (preamble sequence) HD followed by a field PLD containing useful data symbols to be decoded and better known by those skilled in the art using the term "payload". The symbols of the header HD notably contain control information for the decoding of the data in the field PLD together with the number of bytes to be decoder in the field PLD.

The preamble sequence PRM of the frame TRM allows the receiver to be synchronized, in other words an indication to be obtained allowing the structure of the frame to be recovered in order to be able to identify the start of the header HD. The filtering means MFL will be applied, at least during the synchronization phase of the receiver and potentially, as will be seen in more detail hereinafter, during the phase for decoding the remaining part of the frame TRM (header and field PLD) in the case where a noise signal proves to be present.

The filtering means MFL will determine, on the fly, coefficients of a predictive filter from an autoregressive model of the channel digital signal SNC and will then filter, on the fly, the channel digital signal in the time domain by a digital finite impulse response filter whose coefficients are those of the predictive filter.

As is well known by those skilled in the art, a signal may be modeled by means of a white noise convoluted with an autoregressive filter. The parameters of the model (the coefficients of the predictive filter and the variance of the prediction error) can be estimated based on the self-covariance of the signal by solving the Yule Walker equations:

$$R_{n+1}A_n = \begin{bmatrix} r_0 & r_1^* & \cdots & r_n^* \\ r_1 & \ddots & \ddots & \vdots \\ \vdots & \ddots & \ddots & r_1^* \\ r_n & \cdots & r_1 & r_0 \end{bmatrix} \begin{bmatrix} 1 \\ A_{n,1} \\ \vdots \\ A_{n,n} \end{bmatrix} = \begin{bmatrix} \sigma_{f,n}^2 \\ 0 \\ \vdots \\ 0 \end{bmatrix};$$

in which $$A_n = \begin{bmatrix} 1 \\ A_{n,1} \\ \vdots \\ A_{n,n} \end{bmatrix}$$

are the n coefficients of the predictive filter of the autoregressive model of order n and $\sigma_{f,n}^2$ is the variance of the prediction error. The sign * denotes the complex conjugate.

The self-covariance sequence $R_{n+1}=[r_0\ r_1\ \ldots\ r_n]$ may be estimated by the following formula:

$$r_k = \frac{1}{N} \sum_{n=0}^{N-1-k} y_{n+k} y_n \quad k = 0, 1, \ldots, n;$$

in which y is a sequence of N samples of the input signal.

Generally speaking, N must be sufficiently big in order to include all the periodic content of the signal and in order to render random any non-periodic content. However, in practice, N can be equal to the size of the symbol, potentially under-sampled, which also corresponds to the size of the Fourier transform. Several algorithms exist for solving the Yule Walker equations. The Levinson algorithm may notably be mentioned, or the Durbin-Watson algorithm or else the Burg algorithm or alternatively an algorithm of the least squares type. Those skilled in the art will notably be able to refer, for this purpose, to page 879 of Appendix A of the book by John G. Proakis, $3^{rd}$ edition, entitled Digital Communications or else to Chapters 11-4-2 and 11-1-2 of this same book.

When the Levinson algorithm is used, the latter is a recursive algorithm that calculates the coefficients one by one for example according to the following sequence:

$$A_0 = [1]; \sigma_{f,0}^2 = r_0$$

repeat for m=0 to n:

$$\Delta_{m+1} = [r_{m+1} \ldots r_1] A_m$$

$$K_{m+1} = \begin{bmatrix} \dfrac{-\Delta_{m+1}}{\sigma_{f,m}^2} \end{bmatrix}$$

$$A_{m+1} = \begin{bmatrix} A_m \\ 0 \end{bmatrix} + K_{m+1} \begin{bmatrix} 0 \\ JA_m^* \end{bmatrix}$$

$$\sigma_{f,m+1}^2 = \sigma_{f,m}^2 (1 - K_{m+1}^2).$$

Once the coefficients An of the predictive filter are determined, a finite impulse response filter (FIR filter) is then constructed whose transfer function in z is defined by the formula hereinbelow:

$$1 + A_1 z^{-1} + A_2 z^{-2} + A_3 z^{-3} + \ldots$$

In this formula, the coefficients An of the FIR filter are the coefficients An of the predictive filter of the aforementioned autoregressive model. The set of coefficients of the filter is advantageously limited, in other words less than or equal to a limiting number and preferably equal to this limiting number. Indeed, in view notably of the fact that the useful signal is modulated on only a sub-set of carriers from a set of available carriers, too large a number of coefficients of the filter would run the risk of causing too high an attenuation of the signal during the filtering, in particular when there is no noise signal.

Figure 6:
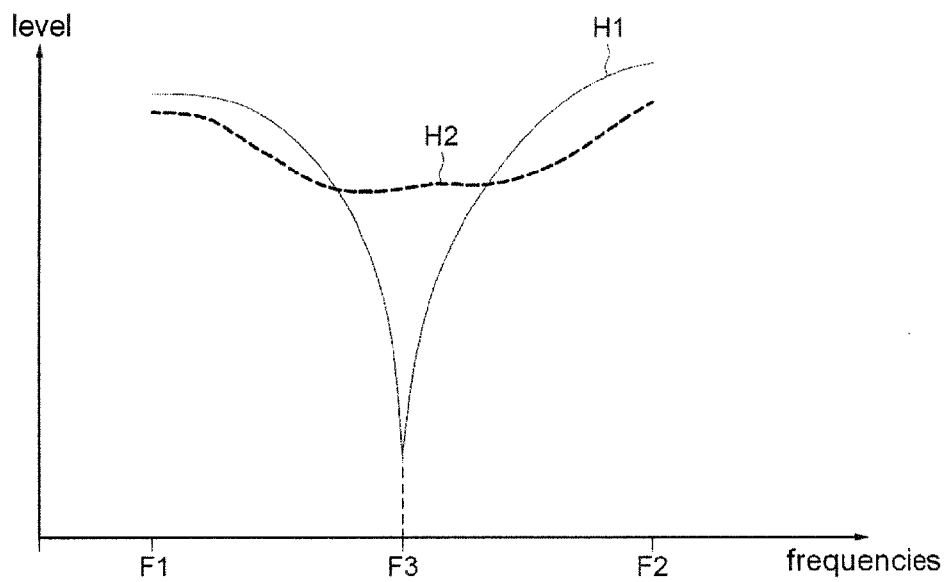
FIG. 6 is a diagram of a frequency response of a filter, according to the present disclosure.

Generally speaking, the limited number of coefficients is chosen by those skilled in the art, taking into account the application and the specifications envisioned, so that, as illustrated schematically in FIG. 6, the frequency response H1 of the filter in the presence of a narrow-band noise signal has a notch in the neighborhood of the frequency F3 of the noise signal, and so that the frequency response H2 of this filter exhibits, in the absence of the noise signal, a relatively flat profile in the frequency band F1, F2 of the useful signal in such a manner as to obtain an attenuation of the signal lower than an acceptable limiting attenuation.

This acceptable limiting attenuation depends on the implementation and on the dynamic behavior supported by the various processing means or processors. Those skilled in the art will be able to choose this acceptable limiting attenuation as a function of these conditions. However, by way of non-limiting example, the acceptable limiting attenuation can be of the order of 6 dB.

In practice, in order to satisfy this condition, a number of coefficients for the filter could, for example, be chosen that is less than or equal to three quarters, and preferably to a half, of the length of the cyclical prefix expressed in number of samples taking into account the processing frequency Fc used. In the PLC-G3 standard, the length of the cyclical prefix for a sampling frequency Fs of 400 KHz is 30 samples. Thus, if the PLC-G3 standard is considered, a number of coefficients equal to 15 Fc/Fs could for example be chosen.

Figure 7:
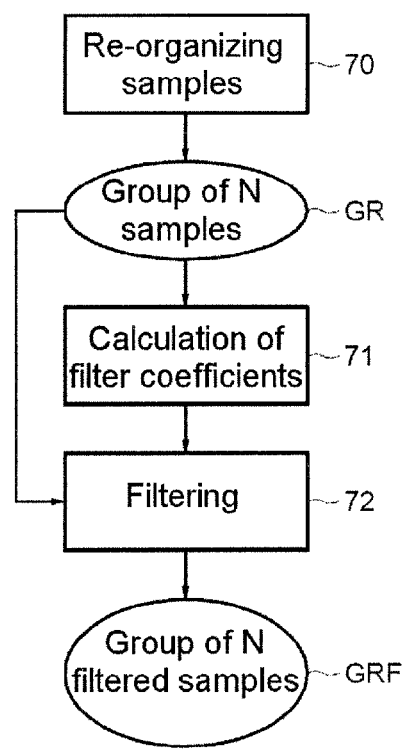
FIG. 7 is a flowchart of a filtering process, according to the present disclosure.

In practice, as illustrated in FIG. 7, the filtering processing carried out on the fly in the time domain includes a grouping of samples (step 70) so as to form a current group GR of N samples. Then, in the step 71, the coefficients of the predictive filter are calculated by executing the Levinson algorithm in accordance with the aforementioned sequence for m varying from 0 to the limiting value for the number of coefficients. Then, in the step 72, the current group GR of N samples in the time domain is filtered with the finite impulse response filter whose coefficients are those that have just been calculated for the predictive filter. A group GRF of N filtered samples is then obtained.

Furthermore, it is advantageous for the processing frequency Fc of the coefficients of the filter (equal to the frequency Fs or potentially to the frequency Fss in the case of under-sampling) not to be too high with respect to the maximum frequency of the channel digital signal (potentially under-sampled). Indeed, if the processing frequency Fc is too high with respect to this maximum frequency, the channel digital signal will not be seen as a "white" noise with respect to the noise signal and there is a risk of having too high an attenuation of the useful signal. Thus, a processing frequency Fc may be chosen in the range between 2 and 5 times, and preferably between 2 and 3 times, the maximum frequency of the channel digital signal on which the coefficient of the filter is calculated.

Figure 8:
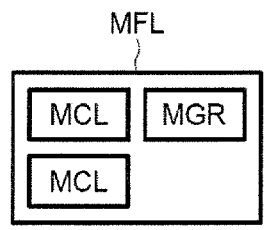
FIG. 8 is a schematic diagram of a filter, according to the present disclosure.

In practice, as illustrated in FIG. 8, the filtering means MFL functionally comprise means or circuitry MGR configured for organizing the samples into groups of samples, a module MCL for calculating coefficients of the predictive filter and a module FIR implementing the finite impulse response filter. In practice, these various circuits and modules can, for example, be implemented by software within a microprocessor.

If reference is again made to FIG. 3, it can be seen that the filtered digital signal SNF delivered by the filtering means MFL is notably used by synchronization means or a synchronizer MSYNC, with a conventional structure known per se, in order to allow the receiver RCP to be synchronized, in other words, for example, to identify the structure of the frame and its timing in such a manner as to be able to correctly decode the header HD and the field PLD.

More precisely, the synchronization means MSYNC perform moving correlation processing operations between the filtered digital signal SNF and a reference signal SREF which is, in the present case, a known symbol of the frame, for example, a known symbol of the preamble sequence, such as the symbol SYNCP. In the example described here, the indication IND representative of the frame structure and of an applied synchronization will, for example, be the occurrence of the transition between the last symbol SYNCP of the preamble sequence and the symbol SYNCM.

This indication IND will be transmitted to the additional processing means MTRS of the processing stage ET2 so as to allow the decoding of the symbols of the header HD and of the field PLD of the frame. However, by simply observing the filtered digital signal, it is very difficult, or even impossible, to know whether this filtered digital signal results from a useful signal affected by noise or from a noise-free useful signal.

Nevertheless, it is advantageous, as will be seen in more detail hereinafter, to know this information so as to further improve the performance characteristics of the decoding of the remaining part of the frame. For this purpose, the processing stage ET2 comprises verification means or a verification circuit MVRF configured for verifying the presence or otherwise of the noise signal within the useful signal, once the synchronization has been carried out. More precisely, this verification will be carried out on the preamble sequence of the unfiltered channel digital signal SNC, and more particularly, on one of the symbols of the preamble sequence, for example the unfiltered symbol SYNCP.

Figure 9:
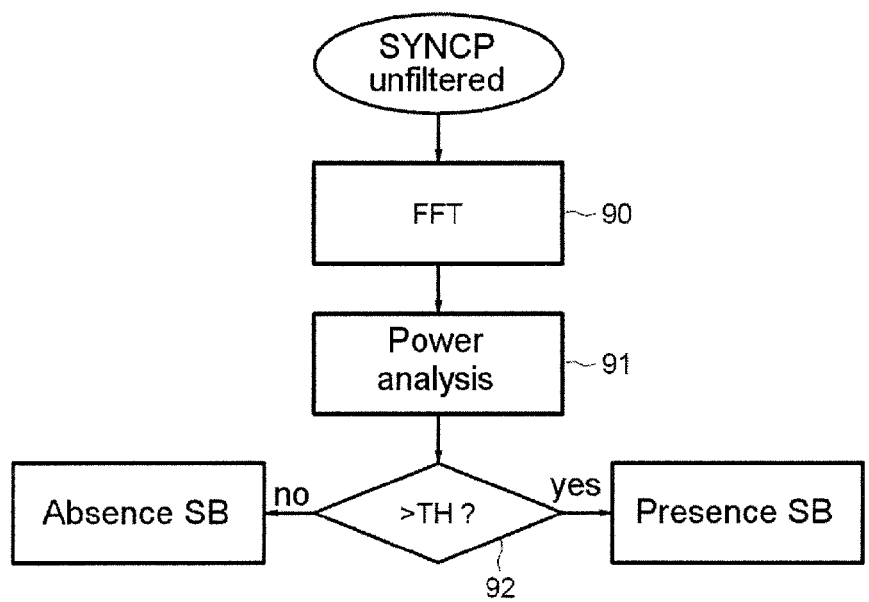
FIG. 9 is a flowchart of a filtering process, according to the present disclosure.

As illustrated in FIG. 9, a direct fast Fourier transform FFT is applied in a step 86 in such a manner as to carry out a transformation from the time domain to the frequency domain, then (in step 91) a power analysis is carried out on the lines of the frequency spectrum obtained at the output of the Fourier transform. For this purpose, in the step 92, it is examined whether certain frequency lines have a power or a level greater than a fixed threshold TH.

If none of the frequency lines of the spectrum has a level higher than the threshold TH, then it is concluded that there is an absence of a noise signal SB within the channel digital signal SNC. In the opposite case, if at least one line has a power higher than the threshold TH, then the presence of a narrow-band noise signal SB is concluded. In addition, this analysis also allows the position in the frequency spectrum of the noise signal to be known, in other words which are the bins concerned.

Accordingly, as illustrated schematically in FIG. 3, the verification means MVRF comprise means or a direct Fourier transform circuit MTFD configured for performing the direct Fourier transform processing, together with means of analysis or an analyzer circuit MAL. In practice, these means may here again be implemented for example by software within a microprocessor. Furthermore, as will be seen hereinafter, the means MTFD are advantageously those which are already present within the additional processing means MTRS.

For the following part of the processing, in other words the decoding of the symbols of the remaining part of the frame, the latter will be carried out on the unfiltered channel digital signal SNC if the result of the aforementioned verification is that this signal SNC was not in fact affected by noise from the narrow-band noise signal SB. On the other hand, if the verification shows that the noise signal was present, then the processing of the remaining part of the frame will continue to be carried out on the filtered digital signal SNF delivered by the filtering means MFL.

For this purpose, control means or a controller, here corresponding by way of illustration to a multiplexer MUX controlled by a signal SC delivered by a control module MC connected to the output of the verification means MVRF and representative of the presence or of the absence of the noise signal, will enable or disable the filtering means MFL for the subsequent processing of the remaining part of the frame. The control module may for example be formed by a logic circuit or else be implemented by software. More precisely, as illustrated schematically in FIG. 3, in the case of absence of a noise signal, the channel digital signal SNC is delivered directly to the additional processing means MTRS, whereas in the presence of the noise signal SB, it is the filtered digital signal SNF that is delivered to the additional processing means MTRS.

Figure 10:
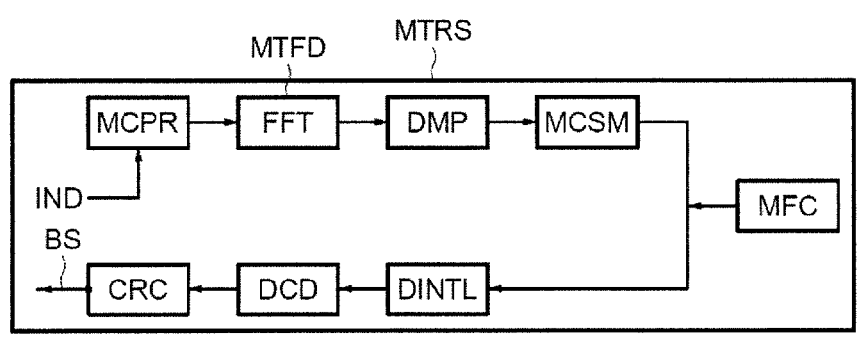
FIG. 10 is a schematic diagram of a processor, according to the present disclosure.

If reference is now made to FIG. 10, it can be seen that these complementary processing means MTRS comprise means or an extractor circuit MCPR configured for extracting the cyclical prefix from each symbol, followed by the means MTFD configured for carrying out the direct fast Fourier transform FFT. The means MTFD are followed by de-mapping means or a de-mapper DMP supplying, for each carrier, a corresponding value of the modulation coefficient (bin). These de-mapping means DMP are followed by a module MCSM configured for determining, for each modulation coefficient, a confidence indicator ("soft decision") for the value. This module is conventional and known per se and uses for example an algorithm of the LogMAP type.

The additional processing means MTRS also comprise de-interlacing means or a de-interlacing circuit DINTL followed by a decoder DCD, for example, a decoder of the Viterbi type, followed by means or a cyclic redundancy check (CRC) circuit CRC able to carry out a parity check. The output of the means CRC is connected to the output terminal BS of the means MTRS which is connected to the means forming the MAC layer of the receiver. When the additional processing means MTRS receive at the input the filtered digital signal, in other words in the presence of a noise signal on the channel digital signal SNC, it is advantageous for the confidence indicators (soft decision) associated with the bins on which the noise signal is present, together with those potentially associated with the neighboring bins, to be set to zero. Indeed, such zero soft decisions are seen as being neutral decisions for the error correction algorithm implemented in the Viterbi decoder.

This allows the performance of the decoding of the de-interlacer-decoder pair to be further improved. For this purpose, the processing means MTRF comprise forcing means or a zeroing circuit MFC configured for applying this forcing to zero. Here again, in practice, all of these means and modules of the additional processing means MTRS may be implemented by software modules within a microprocessor. Furthermore, so as to not interfere with the decoding of the remaining part of the frame when the filtering means MFL are enabled, it is preferable, for the decoding of this remaining part of the frame, for the coefficients of the FIR filter to be fixed, in other words not to progressively update them along with the decoding of the remaining part of the frame. For this purpose, the control module MC can deliver a signal SC1 to the calculation module MCL for freezing the coefficients of the filter.

According to one aspect of the present disclosure, it is thus possible to obtain a notable improvement in performance in the synchronization phases and in the decoding of the symbols of the frame notably in the presence of narrow-band noise signals, which have levels that can go up to 50 to 60 dB above the level of the useful OFDM signal, whereas the current standards only require a robust decoding in the presence of a noise signal whose level only exceeds that of the useful signal by 20 dB.

That which is claimed is:

1. A method for processing an analog signal from a transmission channel, the analog signal comprising a useful signal modulated on a sub-set of carriers from a plurality of available carriers, the useful signal carrying at least one frame of symbols according to a frame structure, the useful signal susceptible to noise, the method comprising:
  analog-to-digital converting of the analog signal into a digital signal;
  synchronizing the digital signal, the synchronizing comprising determining, in a time domain, a number of coefficients of a predictive filter from an autoregressive model of the digital signal, the number indicating a quantity of coefficients of the predictive filter, and filtering the digital signal in the time domain by a digital finite impulse response filter with coefficients based upon the number of coefficients to provide a filtered digital signal; and detecting at least one indication for at least one location in the frame structure to be identified based upon the filtered digital signal and a reference signal.

2. The method according to claim 1 wherein each symbol comprises a cyclical prefix; and wherein a number of the coefficients of the filtering of the digital signal is less than or equal to half of a sample length of the cyclical prefix.

3. The method according to claim 1 wherein the coefficients of the predictive filter are calculated at a processing frequency in a range between 2 and 5 times of a threshold frequency of the digital signal.

4. The method according to claim 1 wherein the determining of the coefficients and the filtering comprise:
organizing of samples of the digital signal into successive groups of samples;
determining a current block of coefficients using a current group of samples; and
applying to the current group of the finite impulse response filter having the current block of coefficients so as to obtain a filtered current group of samples.

5. The method according to claim 1 wherein each frame comprises a preamble sequence comprising known symbols, and a remaining part subsequent to the preamble sequence; and wherein the filtering is applied at least for detecting the at least one indication within the preamble sequence of at least one frame.

6. The method according to claim 5 wherein the filtering is applied at least for detecting the at least one indication within the preamble sequence of each and every frame.

7. The method according to claim 5 further comprising after the detecting of the at least one indication, verifying whether the noise is present based on at least one symbol of an unfiltered version of the useful signal.

8. The method according to claim 7 wherein the verifying comprises a direct Fourier transform processing on the at least one symbol, and an analyzing of a power of each carrier.

9. The method according to claim 7 wherein the verifying is carried out on at least one symbol of the preamble sequence.

10. The method according to claim 9 further comprising processing the remaining part of each frame; and wherein when the noise is not present, the processing of the remaining part of a respective frame is carried out on the unfiltered version of the useful signal.

11. The method according to claim 10 wherein each symbol comprises modulation coefficients respectively associated with the sub-set of carriers; and wherein when the noise is present, the processing of the remaining part comprising
direct Fourier transform processing,
de-mapping processing supplying a value of a respective modulation coefficient for each carrier, and
determining a confidence indicator of a value for each modulation coefficient and a forcing to zero of the confidence indicators of the modulation coefficients associated with carriers whose frequencies correspond to those of the noise.

12. The method according to claim 11 wherein the values of the modulation coefficients are frozen during the processing of the remaining part of the frame.

13. The method according to claim 1 wherein the useful signal is a signal modulated according to an Orthogonal frequency-division multiplexing (OFDM) modulation.

14. The method according to claim 1 wherein the transmission channel is an electrical power line; and wherein the useful signal is a signal carried by power line communications.

15. A receiver comprising:
an input stage to be coupled to a transmission channel and configured to deliver an analog signal from the transmission channel, the analog signal comprising a useful signal modulated on a sub-set of carriers from a plurality of available carriers, the useful signal carrying at least one frame of symbols according to a frame structure, the useful signal susceptible to noise;
an analog-to-digital conversion stage configured to perform an analog/digital conversion of the analog signal into a digital signal; and
a processing stage comprising
a filter configured to
determine, in a time domain, a number of coefficients of a predictive filter from an autoregressive model of the digital signal, the number indicating a quantity of coefficients of the predictive filter, and
apply a digital finite impulse response filter with coefficients based upon the number of coefficients to provide a filtered digital signal, and
a detector configured to detect at least one indication for at least one location in the frame structure to be identified based upon the filtered digital signal and a reference signal.

16. The receiver according to claim 15 wherein each symbol comprises a cyclical prefix; and wherein a number of the coefficients of the filtering of the digital signal is less than or equal to half of a sample length of the cyclical prefix.

17. The receiver according to claim 15 wherein said filter is configured to calculate the coefficients of the predictive filter at a processing frequency in a range between 2 and 5 times of a threshold frequency of the digital signal.

18. The receiver according to claim 15 wherein said filter is configured to:
organize of samples of the digital signal into successive groups of samples;
determine a current block of coefficients using a current group of samples; and
apply to the current group of the finite impulse response filter having the current block of coefficients so as to obtain a filtered current group of samples.

19. The receiver according to claim 15 wherein each frame comprises a preamble sequence comprising known symbols, and a remaining part subsequent to the preamble sequence; and wherein said processing stage is configured to deliver the digital signal to said filter so that said detector detects the at least one indication within the preamble sequence of the at least one frame.

20. The receiver according to claim 19 wherein said processing stage is configured to deliver the digital signal to said filter so that said detector detects the at least one indication within the preamble sequence of each and every frame.

21. The receiver according to claim 19 further comprising a verification circuit configured to, after the detecting of the at least one indication, verify whether the noise is present based on at least one symbol of an unfiltered version of the useful signal.

22. The receiver according to claim 21 wherein said verification circuit comprises:
a direct Fourier transform stage configured to perform a direct Fourier transform processing on the at least one symbol; and
an analyzer configured to carry out an analysis of a power of each carrier.

23. The receiver according to claim 21 wherein said verification circuit is configured to carry out the verification on at least one symbol of the preamble sequence.

24. The receiver according to claim 19 wherein said processing stage is configured to process the remaining part of each frame; and wherein the processing of the remaining part of a respective frame is carried out on the unfiltered version of the useful signal.

25. The receiver according to claim 23 wherein each symbol comprises modulation coefficients respectively associated with the sub-set of carriers; and wherein said processing stage is configured to, when the noise is present, process the remaining part of each frame, the processing of the remaining part comprising direct Fourier transform processing, de-mapping processing supplying a value of a respective modulation coefficient for each carrier, and determining a confidence indicator of a value for each modulation coefficient and a forcing to zero of the confidence indicators of the modulation coefficients associated with carriers whose frequencies correspond to those of the noise.

26. The receiver according to claim 25 wherein said processing stage is configured to disable calculating of the coefficients of said filter during the processing of the remaining part of the frame.

27. The receiver according to claim 15 wherein the useful signal is a signal modulated according to an Orthogonal frequency-division multiplexing (OFDM) modulation.

28. The receiver according to claim 15 wherein the transmission channel is an electrical power line; and wherein the useful signal is a signal carried by power line communications.

29. A receiver comprising:
an input stage configured to receive an electrical power line analog signal comprising a useful signal modulated on a sub-set of carriers from a plurality of available carriers, the useful signal carrying at least one frame of symbols according to a frame structure, the useful signal susceptible to noise;
an analog-to-digital conversion stage configured to perform an analog/digital conversion of the electrical power line analog signal into a digital signal; and
a processing stage comprising
a filter configured to
determine a number of coefficients of a predictive filter from the digital signal, the number indicating a quantity of coefficients of the predictive filter, and
apply a digital finite impulse response filter with coefficients based upon the number of coefficients to provide a filtered digital signal, and
a detector configured to detect at least one indication for at least one location in the frame structure to be identified based upon the filtered digital signal and a reference signal.

30. The receiver according to claim 29 wherein each symbol comprises a cyclical prefix; and wherein a number of the coefficients of the filtering of the digital signal is less than or equal to half of a sample length of the cyclical prefix.

31. The receiver according to claim 29 wherein said filter is configured to calculate the coefficients of the predictive filter at a processing frequency in a range between 2 and 5 times of a threshold frequency of the digital signal.

32. The receiver according to claim 29 wherein said filter is configured to:
organize of samples of the digital signal into successive groups of samples;
determine a current block of coefficients using a current group of samples; and
apply to the current group of the finite impulse response filter having the current block of coefficients so as to obtain a filtered current group of samples.

33. The receiver according to claim 29 wherein each frame comprises a preamble sequence comprising known symbols, and a remaining part subsequent to the preamble sequence; and wherein said processing stage is configured to deliver the digital signal to said filter so that said detector detects the at least one indication within the preamble sequence of the at least one frame.

* * * * *